(12) United States Patent
Anderson

(10) Patent No.: US 6,793,438 B2
(45) Date of Patent: Sep. 21, 2004

(54) PROCESS AND RELATED APPARATUS FOR REPAIRING AQUATIC PROPELLER SCARS AND BLOWOUTS

(76) Inventor: James F. Anderson, 3941 24th St. SE., Ruskin, FL (US) 33570

( * ) Notice: Subject to any disclaimer, the term of this patent is extended or adjusted under 35 U.S.C. 154(b) by 43 days.

(21) Appl. No.: 10/385,922

(22) Filed: Mar. 11, 2003

(65) Prior Publication Data

US 2003/0150160 A1 Aug. 14, 2003

Related U.S. Application Data

(63) Continuation-in-part of application No. 10/278,219, filed on Oct. 23, 2002, now abandoned, which is a continuation-in-part of application No. 09/573,724, filed on May 18, 2000, now abandoned.

(51) Int. Cl.[7] .................................................. E02B 3/04
(52) U.S. Cl. ............................ 405/24; 405/19; 47/59; 47/65.8; 47/74
(58) Field of Search .............................. 405/15, 16, 19, 405/21, 24, 25, 74, 107, 114–117, 302.4, 302.6; 47/59, 65.7, 65.8, 33, 63, 64, 74

(56) References Cited

U.S. PATENT DOCUMENTS 3,608,238 A * 9/1971 Reuter ............................ 47/64
3,613,309 A * 10/1971 Coburn ........................... 47/79
5,193,306 A * 3/1993 Whisenant ................... 47/65.8
5,241,783 A * 9/1993 Krueger ....................... 47/65.8
5,309,673 A * 5/1994 Stover et al. ................ 47/59 R
6,415,548 B1 * 7/2002 Mumme ...................... 47/65.8

* cited by examiner

Primary Examiner—Thomas B. Will
Assistant Examiner—Tara L. Mayo
(74) Attorney, Agent, or Firm—Donald R Bahr (57) ABSTRACT

Aquatic plant shoots are transplanted by positioning shoots, plants or seeds in a sediment tube or sediment bag which is in turn placed in a propeller scar or blowout.

The sediment tubes and sediment bags may be preformed or they may be formed just prior to their placement in the estuary.

With the process and apparatus of this invention, sea grass shoots, plants and seeds can be replanted on the bottom of an estuary and new plant growth encouraged in propeller scars and blowouts.

The material from which the sediment tube or bag is formed from degrades. The degradation of the sediment tube or bag can be correlated to the growing cycle of seagrass plants, shoots or seeds as may be contained in the sediment tube or bag.

20 Claims, 8 Drawing Sheets

PROCESS AND RELATED APPARATUS FOR REPAIRING AQUATIC PROPELLER SCARS AND BLOWOUTS

RELATED APPLICATIONS

This application is a continuation in part application of application Ser. No. 10/278,219 filed Oct. 23, 2002 now abandoned, which in turn is a continuation in part application of application Ser. No. 09/573,724 filed May 18, 2000 now abandoned.

BACKGROUND OF THE INVENTION

This invention is concerned with a process and related apparatus whereby aquatic propeller scars and blowouts may be repaired underwater for purposes of restoration. The restoration of all aspects of the environment has become extremely important in recent years. The three areas of restoration which are of primary import are reducing air pollution, restoring and cleaning up the land and cleaning up and restoring our waterways, the ocean and related estuaries. It is these related estuaries that are the primary thrust of the subject invention.

As a result of the decrease in water quality, millions of acres of aquatic plant life, which form an important part of the aquatic Eco system, have been destroyed. While the restoration of aquatic plant life is difficult, it is possible, for example see the process and apparatus of co pending application Ser. No. 09/104,681 filed Jun. 25, 1998 now U.S. Pat. No. 6,070,537 and application Ser. No. 09/573,724 filed May 18, 2000. While the process of this U.S. Pat. No. 6,070,537 is well suited to the planting of large underwater areas it is not particularly suited to the replanting of propeller scars or blowouts. Propeller scars are areas that have been striped of aquatic plant life, as a result of the propeller of the moving boat inadvertently being allowed to come into contact with the estuary bottom, thereby leaving a semicircular trench on the bottom of estuary. A blowout results when the hydraulic action of a propeller wash forms a hole in the estuary bottom.

Because aquatic plant life is an important part of the complex aquatic environment, the restoration of the total estuary bottom is important including propeller scars and blowouts.

The natural restoration of aquatic life, in propeller scars and blowouts is an extremely slow process. While it is possible to manually plant shoots of aquatic plants, in propeller scars this process is extremely slow and expensive. Due to the cost of labor, the manual planting of sea grass plants has at best been marginally successful. Further due to the peculiar nature of propeller scars manual planting is often unsuccessful. Also because propeller scars are widely dispersed the cost of manually planting just one propeller scar in an estuary can be prohibitive. Likewise manual planting in some instances is of questionable success as the person doing the planting, in walking over the bottom of an estuary, does further damage by crushing other plants which may be growing in the area. Blowouts present another problem in that they are usually so deep that sea grass can not recolonize the blowout.

This invention is concerned with a process and apparatus whereby sea grass can be restored and quickly planted in an economical fashion in a propeller scar or blowout or the propeller scar or blowout can be filled in such a manner that the re-colonization of sea grass is encouraged. Generally, it could be said that the process of this invention stabilizes the propeller scar or blowout such that plant growth is encouraged.

As used in connection with this invention, the term aquatic plant life and sea grass includes many species of plant life such as halodule wrightii (shoal grass), thalassia (turtle grass), etc. The process and apparatus of this invention is particularly suited to the planting of thalossia sea grass in propeller scars and blowouts for the re-colonization of sea grass in these propeller scars and blowouts.

Aquatic plant life as it exists in estuaries is important in preventing water pollution as this plant life acts as a filter for many pollutants and hence, this plant life helps to maintain water quality. Therefore it is important that the maximum area be covered with aquatic plants including those areas that have been denuded of plant life by the contact of a marine propeller with the estuary bottom or the hydraulic action of a marine propeller.

The restoration of aquatic life to the bottom of our estuaries is extremely important as this aquatic plant life plays a critical function in the total marine Eco system. A large number of important marine animals, both warm and cold blooded, rely totally or in part on aquatic plants as a breeding area, for cover, for food, etc. For example, the endangered manatee relies solely on sea grass as its food source and sea turtles rely on sea grass for part of their diet.

OBJECT OF THE INVENTION

The primary object of this invention is a process whereby aquatic plant life may be planted or restored in propeller scars or blowouts which are located in the bottom of an estuary.

A further object of this invention is a process whereby a propeller scar or blowout can be filled in such a manner as to encourage the re-growth of sea grass.

DESCRIPTION OF THE DRAWINGS

FIGS. 8 and 8a are perspective and end views showing sand being placed in the tube for use in this invention.

FIGS. 9 and 9a are perspective and end views showing the final closure of the tube for use in this invention.

FIG. 10 is a perspective view showing the sediment tube as produced in accordance with FIGS. 6 to 9a.

DESCRIPTION OF THE PREFERRED EMBODIMENTS

The subject invention relates to a process and apparatus for planting aquatic plants, and for encouraging aquatic plant growth in scars such as propeller scars and blowouts.

Referring to FIGS. 1, 1a, 1b, 2 and 3, a broad perspective of this invention can be seen.

Figure 1:
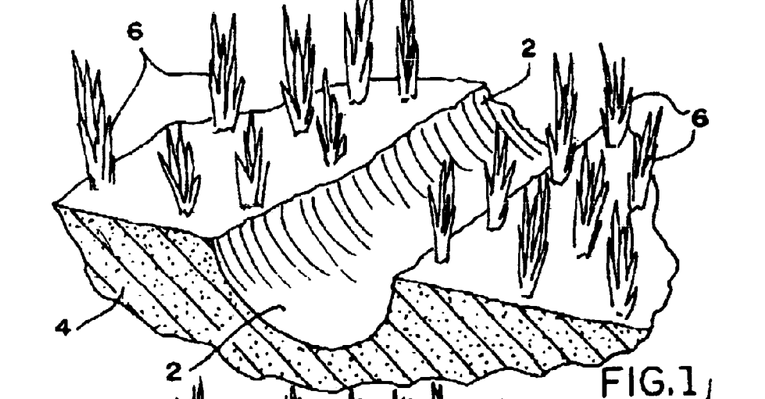
FIG. 1 is a sectioned perspective view showing a propeller scar.

FIG. 1 shows the anatomy of a scar in the illustrated instance a propeller scar 2. Propeller scar 2 is essentially a furrow that has been plowed into the bottom 4 of an estuary by the action of a rotating propeller. As can be seen estuary bottom 4 incorporates existing sea grass 6 which is naturally occurring. Further it can be seen that propeller scar 2 has been denuded of sea grass by the rotation of the propeller.

In most instances propeller scars are the result of the inadvertent action of a boater. As is discussed above sea grass is an important part of the Eco system. In addition sea grass is beneficial in that it provides refuge and cover for small fish and other aquatic life, which in turn attracts larger fish. The presence of these larger fish is the start of the propeller scar problem as these large fish attract sport and commercial fisherman. These fisherman either as a result of their carelessness or enthusiasm sometimes let their boats enter water which is too shallow for the boat in question. Further this positioning of the boat in water which is too shallow often results from changing water levels i.e. a falling tide.

When a boat is in water which is too shallow the propeller often comes into contact with the estuary bottom. When estuary bottom 4 is sandy it is possible for a boat to move forward even if the propeller is in contact with estuary bottom 4. Regretfully this careless action of the boater causes the propeller to plow the estuary bottom 4 such that a propeller scar 2 is formed.

The subject invention has multiple embodiments, the first embodiment relates to the placement of a sediment tube into the propeller scar in order to facilitate the reintroduction of sea grass into the propeller scar. The sediment tube in this instance incorporates shoots of an appropriate aquatic plant.

The second embodiment relates to the interpretation of the natural flow of water in a propeller scar in such a manner that native aquatic plants can root in the propeller scar.

Figure 2:
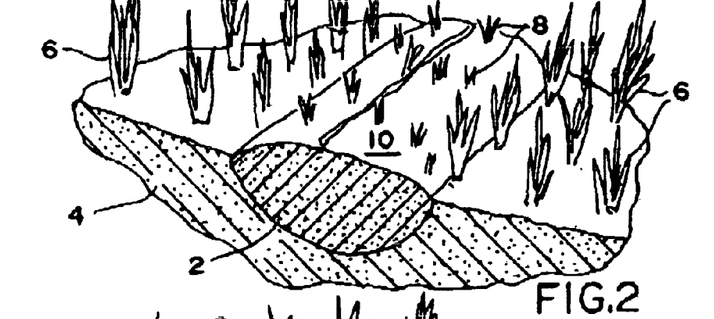
FIG. 2 is a sectioned perspective view showing the placement of the sediment tube of this invention in an underwater propeller scar.

As to the first embodiment of this invention referring to FIG. 2, it can be seen that sediment tube 10 is placed in propeller scar 2. Sediment tube 10 is an elongated structure which is filled with a growing medium i.e. sand or other material which is conducive to plant growth. When positioned in propeller scar 2 sediment tube 10, incorporates a plurality of sea grass plant shoots 8, which over an extended period of time grow and take root in estuary bottom 4.

Figure 3:
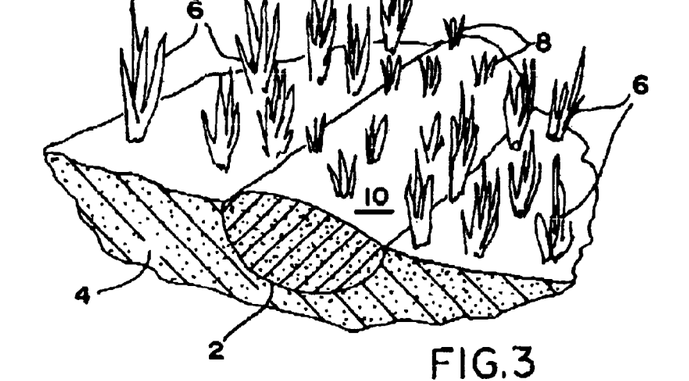
FIG. 3 is a sectioned view of the continued placement of the sediment tube of this invention in the propeller scar and the restoration of aquatic plants in this scar.

FIG. 3 illustrates the planting process of this invention when the restoration of growing sea grass 8 to propeller scar 2 is essentially complete. From this figure it can be seen that propeller scar 2 has essentially been filled in and sea grass plant shoots 8 have rooted and started to grow. Sediment tube 10 is formed from a biodegradable material which will degrade in a predetermined period of time. At the start of the planting process illustrated in figure 3 the degeneration of sediment tube 10 has started. Sediment tube 10 can be formed from a variety of materials such as natural and synthetic textiles, degradable polymers and biodegradable polymers, which contain materials such as starch, to aid in there biodegradation. Polymeric films which are formulated without ultraviolet inhibitors or limited amounts of ultraviolet inhibitors are also preferred as these films readily degrade as a result of exposure to sunlight. The most preferred material for use in the manufacture of sediment tube 10 is cotton fabric. Cotton being a natural fiber is completely compatible with estuary bottom environment. Further cotton is easy to work with, to sew and it is inexpensive. It has been found that sediment tubes which are formed from cotton essentially degrade in four to six months which is the proper time for sea grass shoots 8 to grow, take root and penetrate sediment tube 10 through to estuary bottom 4 or for runners 7 from naturally occurring sea grass 6 to take root. Other natural fibers which can be used are coconut fibers, hemp and burlap. Further mixtures of the above mentioned fibers and materials can be used to form the sediment tubes and sediment bags as are used in this invention.

Figure 4:
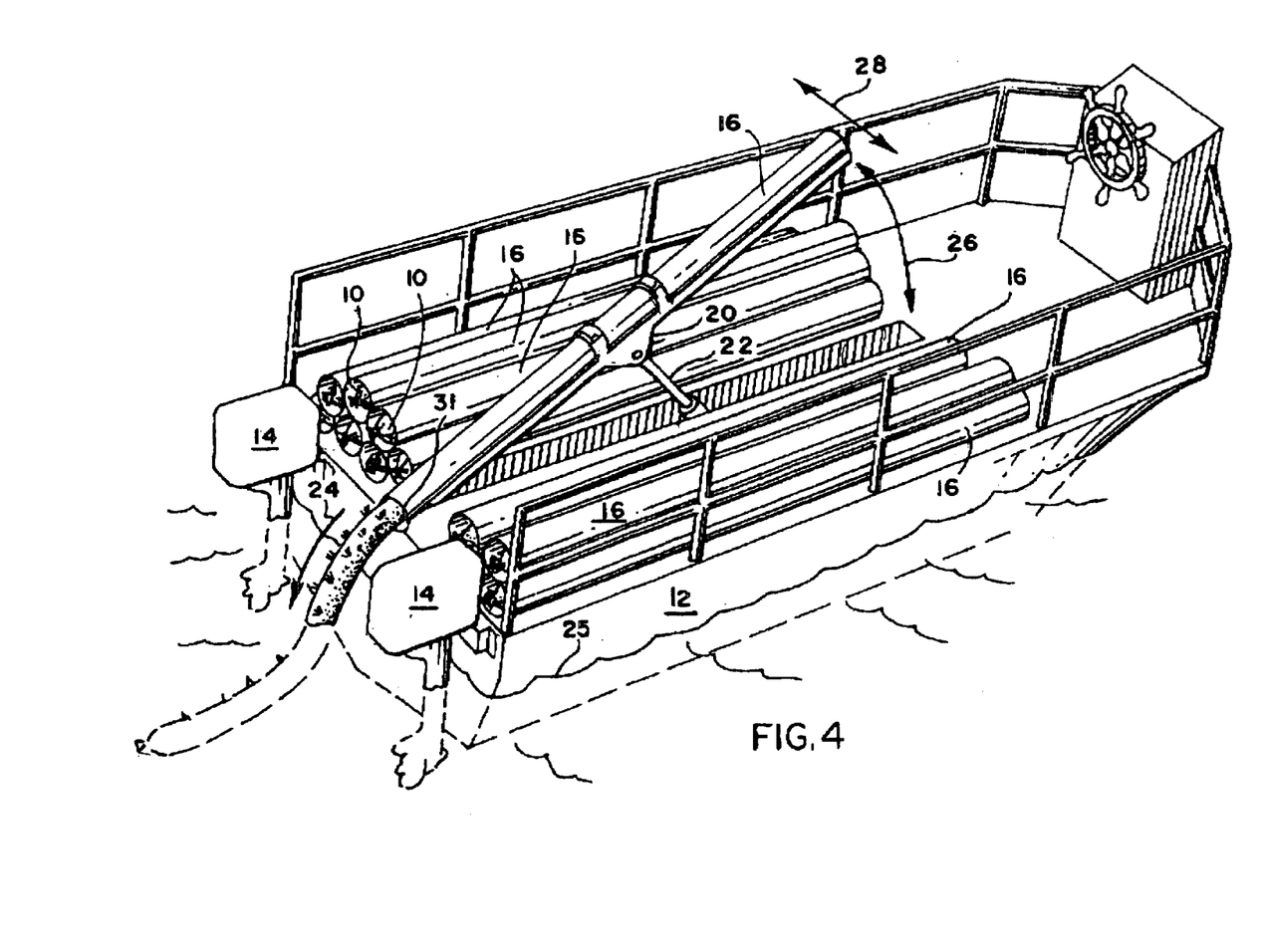
FIG. 4 is a perspective view of the discharge of a sediment tube of this invention into an estuary.

FIG. 4 shows apparatus in accordance with this invention whereby preformed sediment tubes 10 and 11 may be positioned in a propeller scar. In this embodiment a boat 12 is provided, this boat being propelled by one or more outboard engines 14. A plurality of sediment tubes 10 and 11 are formed, preferably onshore. These sediment tubes are filed with a growing medium and may have a plurality of sea grass shoots 8 planted therein. These preformed sediment tubes 10 and 11 are then positioned in tubular support 16 which in their simplest forms are 10 to 20 foot sections of PVC pipe. In operation a tubular member 16 is loaded into a support 20 which may be elevated by a hydraulic motor 22. Upon the elevation of support 20, in accordance with arrow 26, the preformed tube slides out of tubular member 16 and slips below water surface 25 and into a propeller scar, not shown. The slippage of tubes 10 or 11 out of tubular support 16 is in accordance with arrow 24. Support 20 is further pivotally mounted to hydraulic motor 22 such that horizontal rotation in the direction of arrow 28 is possible. With this rotational capability an operator in the rear of boat 12 is able to move end 31 of tubular member 16 in such a manner that tubes 10 or 11 may be precisely guided into the propeller scar.

Figure 5:
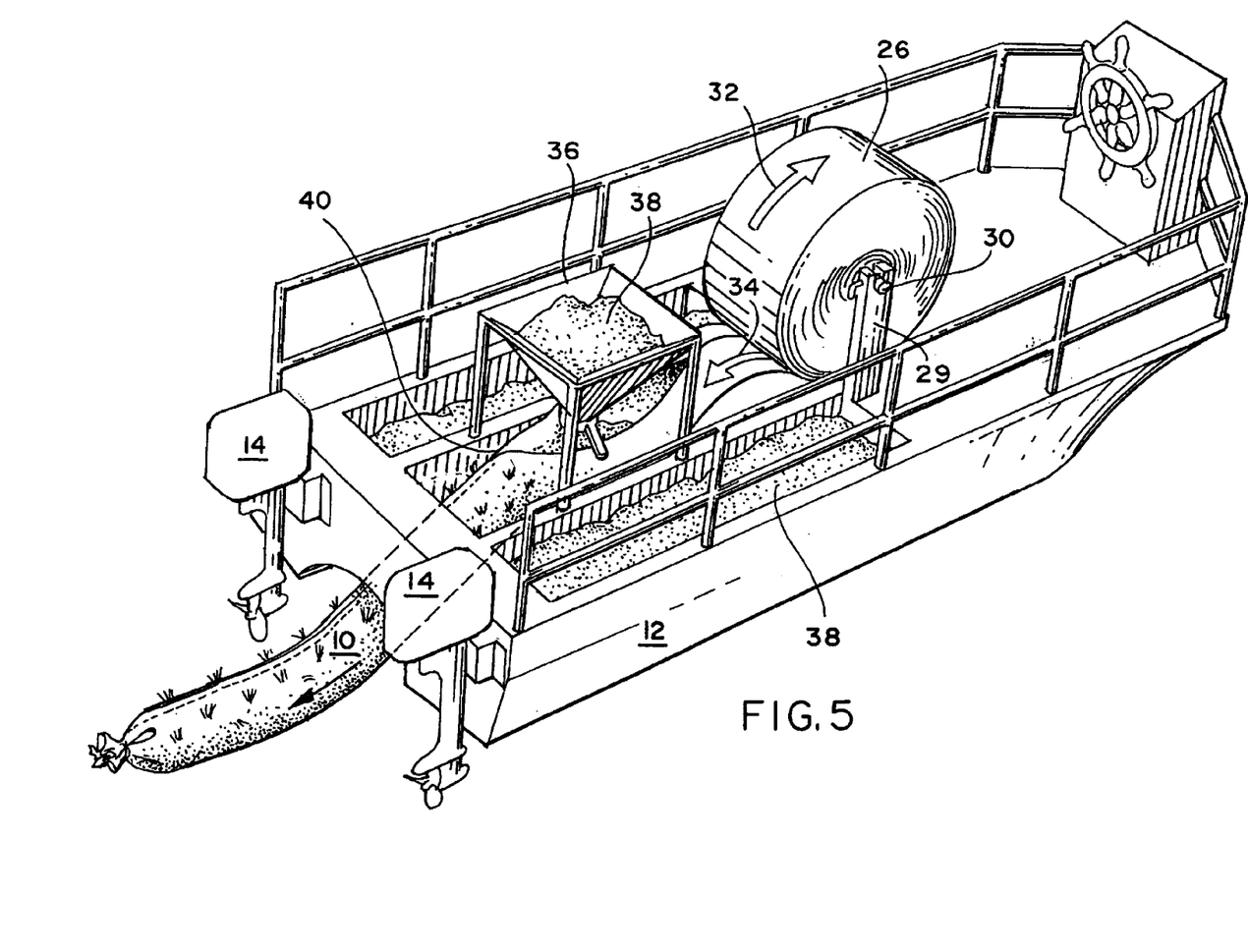
FIG. 5 is a perspective view showing the formation of a sediment tube and it's discharge into an estuary.
Figures 6, 6A, 7, 7A:
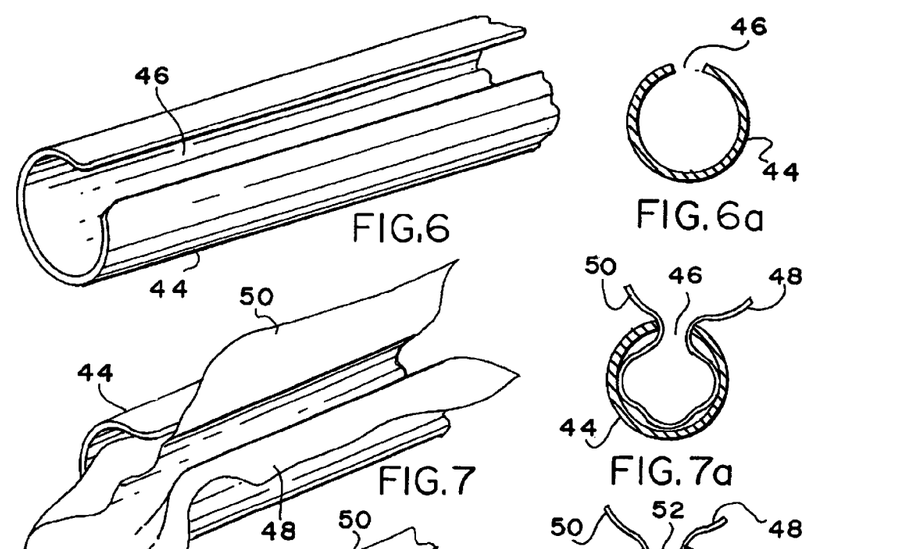
FIGS. 6 and 6a are perspective and end view showing a tube which is particularly suitable for forming a sediment tube for use in this invention.
FIGS. 7 and 7a are perspective and end view showing the initial steps in the forming of a sediment tube for use in this invention.

FIG. 5 illustrates still another embodiment of this invention, wherein the deck of boat 12 is further supplied with a roll 26 of textile or film material which is supported on stand 29 via rollers 30. Upon the rotation of roll 26 in the direction of arrow 32 a section of material 34 is played off of roll 26. Sheet material 34 is then partially closed and granular material (sand) 38 is fed out of hopper 36 and into the partially closed section of sheet material 34. The closure of sheet material 34 is then completed and the closure is secured with an adhesive or by, stapling or heat sealing in a conventional manner. This closure is effected by means 40.

Plant shoots 8 are then placed in the preformed sediment tube 10 at station 42 this placement may be either manual or automated.

Referring back to FIG. 1 it has been found that because of the semicircular nature of propeller scar 2 if water flow through the propeller scar is impeded organic debris will accumulate in the bottom of propeller scar 2. This ongoing accumulation of debris is conducive to the colonization of sea grass in propeller scar 2. In order to assist in the re-colonization of seagrass it is preferred that sediment tube 10 be filled with pure sand and preferably sand which incorporates fertilizer. It is preferred that the sand incorporate about 10% percent fertilizer. While the preferred fertilizer is granular as an alternate means of fertilizing the propeller scar 2 liquid fertilizer may be injected into the area on either side of the propeller scar after sediment tube 10 is placed in said propeller scar. The fertilizer may be of the granular time release variety wherein the time release of the fertilizer is timed for the optimum encouragement of plant growth.

The above discussion and drawings show the placement of a plurality of plant shoots 8 in sediment tube 10. In the second embodiment of this invention plant shoots 8 may be omitted from sediment tube 10. In this embodiment tube 11 without plant shoots 8 is placed in propeller scar 2 in order to stabilize and fill propeller scar 2. Once this propeller scar is filled and stabilized natural re-colonization of sea grass will occur from either side of the propeller scar It is preferred that sediment tube 10 be if such a size that the filling of propeller scar 2 is slightly higher than the surrounding estuary bottom.

Figure 1A:
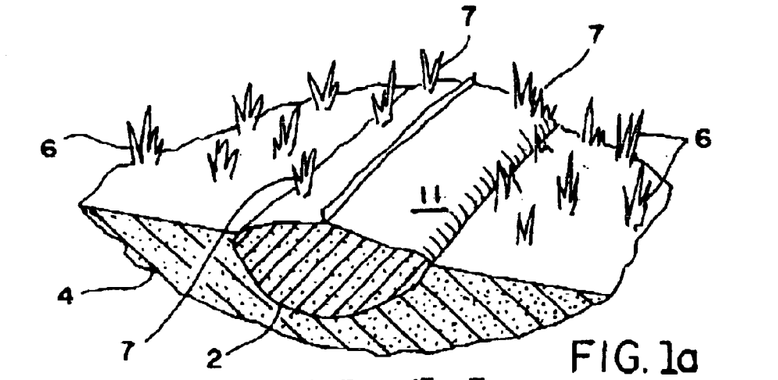
FIG. 1a is a sectioned perspective view showing a propeller scar with a sediment tube therein.

As to this second embodiment of this invention, it can be seen from FIGS. 1 and 1a propeller scar 2 is essentially a trough through which water can flow unimpeded. With water flow i.e. tidal currents, water is moving back and forth on a constant basis, through propeller scar 2. As a result of this constant water movement existing native grass 6 cannot spread into propeller scar 2. That is as native grass puts out runners into propeller scar 2 the rooting of these runners is constantly being disrupted by the constant water flow through propeller scar 2. In accordance with this embodiment of this invention water flow through propeller scar 2 is impeded in such a manner that sediment builds up and the runners from native grass 6 can root in propeller scar 2.

Figure 1B:
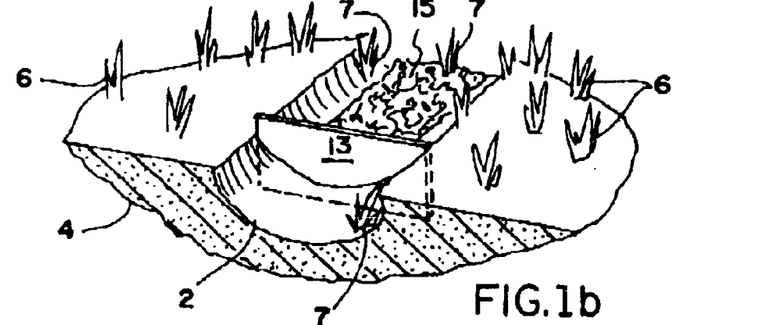
FIG. 1b is a sectioned perspective view showing a propeller scar with a baffle n therein.

Referring to FIG. 1a it can be seen that when tube 11 is placed in propeller scar 2 the flow of water through propeller scar 2 is restricted. Because water no longer freely flows through propeller scar 2 runners 7 from native grass 6 can root in propeller scar 2. It should be noted that in this embodiment tube 11 does not incorporate plant shoots. Referring to FIG. 1b a variation of the second embodiment of this invention is disclosed in this structure a baffle 13 is placed across propeller scar 2 in such a manner that the water flow is interrupted thereby allowing sediment 15 to build up in propeller scar 2. With this build up of sediment shoots 7 from native aquatic plants 6 can root in propeller scar 2 which incorporates sediment build up 15.

Baffles 13 can be formed from any convenient material such as plastics, metals fibers or wood. In the case of plastic baffles the polymer utilized can be biodegradable an can be designed to disintegrate in a set period of time i.e. 12 months.

In the case of metals baffle 13 it can be designed to corrode away in a set period of time i.e. a ferrous metal baffle which will rust away in 12 months.

Figure 1C:
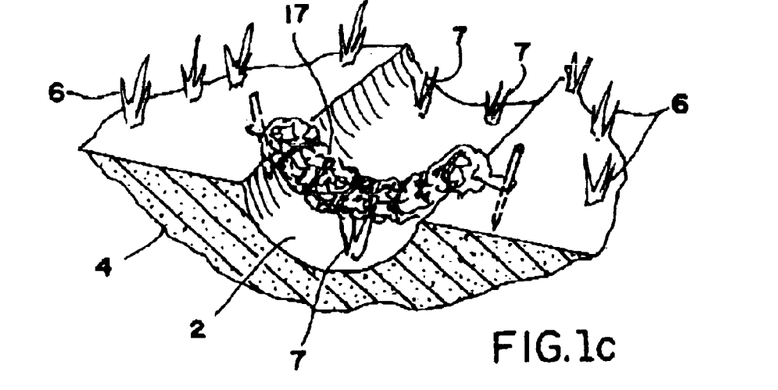
FIG. 1c is a perspective view showing a segmented sediment tube for use in this invention.

Further it is understood that baffle 13 can assume any convenient shape and can incorporate legs to facilitate its placement in propeller scar 2. The means whereby the water flow through the propeller scar may be impeded can assume other forms. For example as is shown in FIG. 1c the water flow through propeller scar 2 can be impeded by the placement and staking of a bundle of tied plants 17 in propeller scar 2. Bundle 17 is weighted in order to prevent movement by the current of water moving through propeller scar 2.

Figures 11, 12, 13:
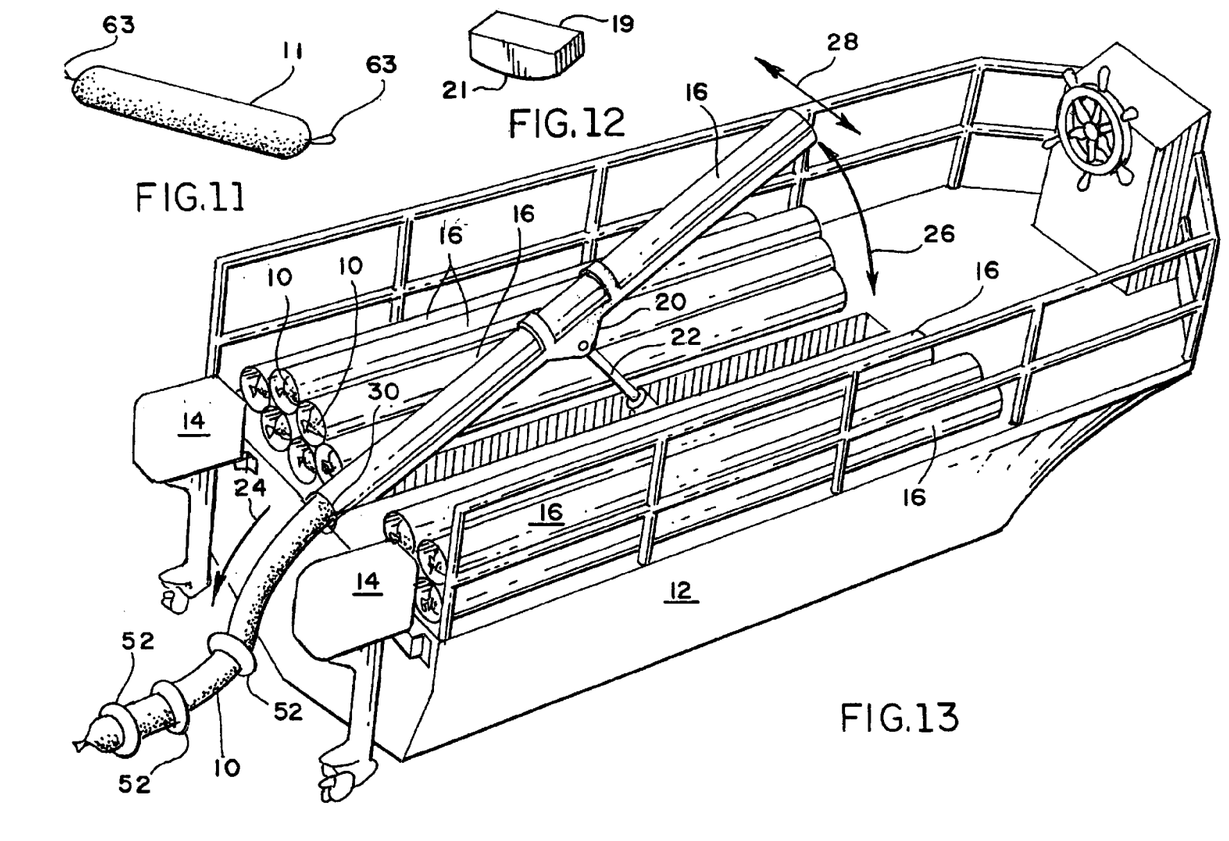
FIG. 11 is a perspective view showing an alternate embodiment of a sediment tube for use in this invention.
FIG. 12 is a perspective view showing a brick which may be used to impede the flow of water through a propeller scar in accordance with this invention.
FIG. 13 is a perspective view showing a method for positioning a sediment tube over a propeller scar.

Further as is shown in FIG. 12. the water flow through propeller scar 2 may be impeded by putting a dam like structure in propeller scar 2. Dam like structure may be brick 19 which is further illustrated in FIG. 12. Brick 19 has an arcuate bottom 21 which roughly corresponds to the arcuate shape of propeller scar 2.

Brick 19 may be formed from clay which is fired in such a manner that it will disintegrate over a predetermined period of time in an aqueous environment. That is because brick 19 is not completely fired it tends to disintegrate when exposed to water for an extended period of time. The degree to which brick 19 is fired controls the rate of disintegration of brick 19.

A series of baffles 13 can be placed along propeller scar 2 at distances of from 1 to 6 feet apart.

As can be seen in FIG. 11 tube 11 can incorporate means whereby a plurality of tubes may be joined together.

In the illustrated instance the joining means are loops 63 on the terminal ends of tube 11. Via these loops a series of tubes 11 may be joined together i.e. by tying the loops together or by placing a pin through overlapping loops.

Figures 8, 8A, 9, 9A, 10:
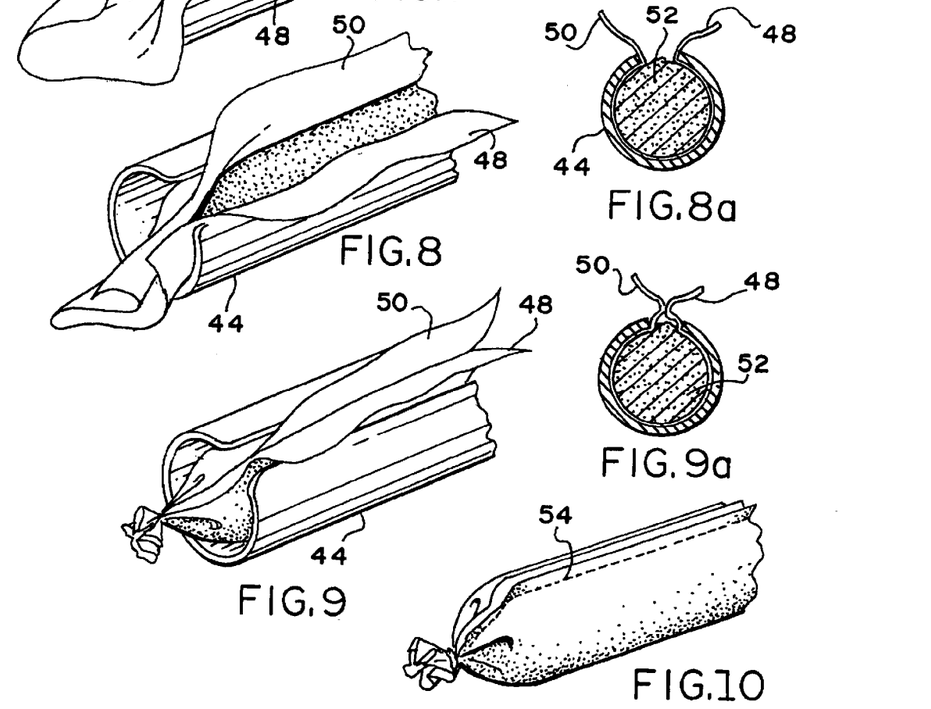

Referring to FIGS. 6–10 a method for filing tubes 10 and 11 with sand can be seen. In the embodiment an elongated tubular support 44 having a slot 46 cut therein is created, tubular support 44 is usually 10 or 20 ft. long. An elongated section of cloth 47 is then tucked into tubular support 44 with the ends protruding tubular support 44 and the traverse edges 48 and 50, of cloth segment 47 protrude from slot 46. As is shown in FIGS. 8 tube 44 is then filled with sand 52. Transverse edges 48 and 50 are then secured together by sewing, stapling or with an adhesive. The ends, are then tied off and the sediment tube 10 or 11 is removed from tubular support 44. As a alternate embodiment the finished sediment tube 10 or 11 can be transporting to the job site in tube 44.

FIG. 13 discloses an alternate method whereby sediment 10 may be positioned over a propeller scar (not shown). In this embodiment of this invention as sediment tube 10 reaches the waters edge a workman places a series of flotation devices around (rings shown) sediment tube 10. Flotation rings 52 are of such a buoyancy that they can float sediment tube 10 which can weigh many hundreds of pounds. When sediment tube 10 is free floating it can then be readily maneuvered to a desired location, whereupon floatation rings 52 are removed one at a time in order to allow sediment tube 10 to settle into the propeller scar.

Figure 14:
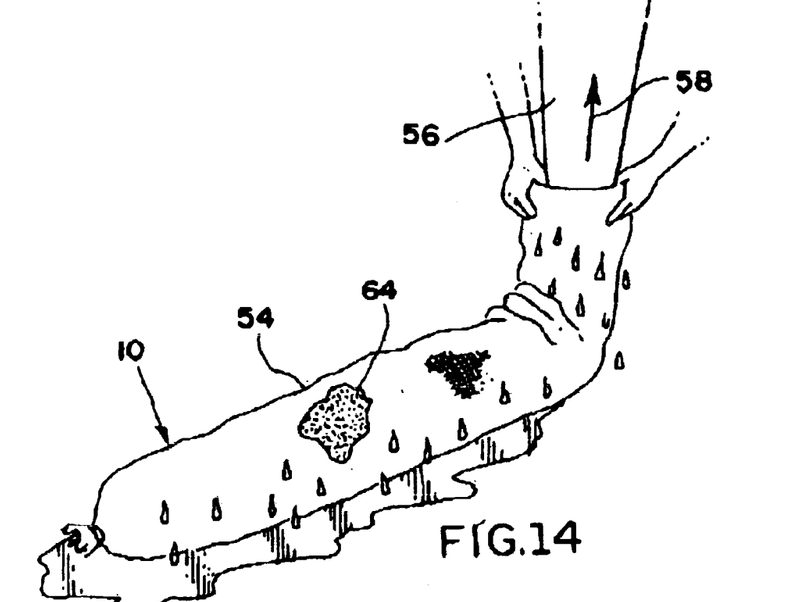
FIG. 14 is a perspective view showing a method for forming a sediment tube for use in accordance with this invention.

FIG. 14 shows an alternate method for forming a sediment tube 10. In this method a preferred tube 54 is positioned over a section 56 through which is pumped a slurry of sand and water. Sediment tube 10 has walls which are porous, whereby the water component of the slurry passes through the tube walls. As pipe section 56 is slowly withdrawn in the direction of arrow 58 preformed tube section 54 is gradually filled with sand 64 in such a manner as to form a completed sediment tube.

Figure 15:
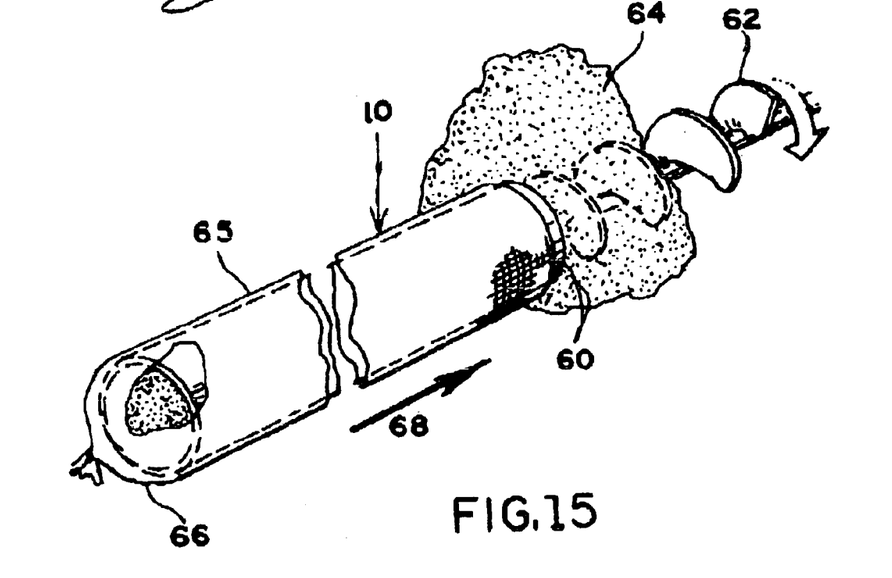
FIG. 15 is a perspective view showing still another method for forming a sediment tube for use with this invention.

FIG. 15 illustrates still another method for forming a sediment tube 10. Here a preformed tube 65 is positioned over a pipe section 60 which incorporates an internal auger 62. As auger 62 is rotated sand 64 is propelled to the head 66 of tube section 65. As pipe section 60 is withdrawn in the direction of arrow 68 preformed tube section 65 is filled with sand 64 thereby forming a completed sediment tube which can be used with or without plant shoots in accordance with the above description.

The material from which sediments tubes 10 and 11 are formed may be in brightly colored in order to facilitate present and future placement and location of the sediment tube. These observations are useful in determining the effectiveness of the overall restoration.

Sediment Tubes 10 and 11 for use in accordance with this invention for most applications should be 6 to 12 inches in diameter. Smaller diameter tubes are usually used for the propeller scars from pleasure craft whereas the larger diameter tubes are useful in conjunction with propeller scars from commercial craft. Tubes 10 and 11 are usually 3 to 20 ft. long and the length of the sediment tube is at least ten times the diameter of the tube. A more preferred range is that the length is 10 to 30 times the diameter of the sediment tube.

As is discussed above sediment tubes 10 and 11 are filled with a medium which is conducive to plant growth. While it is preferred that sediment tubes 10 and 11 be filled with sand these tubes can be filled with other media such as cement, slag, gravel, stones, rocks, clay etc.

While the above description relates primarily to propeller scars it is understood by one skilled in the art that scars in an estuary bottom can be created by other than the contact of a propeller with the estuary bottom. For example a scar can be created by the keel or rudder of a boat coming into contact with the estuary bottom or by something being dragged across the estuary bottom. As will be described below blowouts are formed by the hydraulic action of a propeller wash.

Further the above description relates to the use of various types of apparatus for the placement of the sediment tube in the scar. It is understood that the sediment tubes and the other disclosed devices can be manually placed in the scar without the need for specialized apparatus.

The subject invention further includes a process for repairing blowouts. A blowout is a hole which has been formed by the wash action of a boat propeller or by the mechanical action of a boat keel on an estuary bottom. A blow out is usually formed when a boat runs aground and tries to pull itself free by using the action of ts own propeller. i.e. a boat runs aground and the operator of the tries to free the boat by putting the boat in reverse and applying maximum power. In many cases the boat does not free itself on the first try. The concentrated and continuing action of the propeller wash tends to dig a hole as a result of the hydraulic action of the propeller wash. In many cases these blow out holes are one to eight feet deep when compared to the surrounding estuary bottom. In the process of digging the hole all plant life is uprooted and destroyed. At the end of the process a bare hole remains which is devoid of plant life. Further, as is discussed above, plant life such as sea grass has a difficult time in repopulating the bare blowout due to elevation differences between the seabed and the blowout and the action of tidal currents.

In order for the blowout to be repopulated with seagrass the blowout must be stabilized.

In accordance with one embodiment of this invention this stabilization is effected by planting a large number of sediment bags in the blowout.

Figure 16:
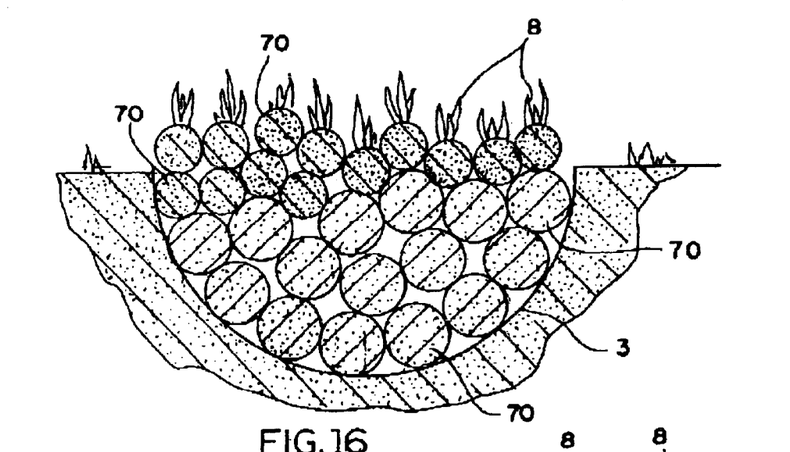
FIG. 16 is a side section view showing a process for restoring sea grass to a blowout.

As can be seen from FIG. 16 sediment bag 70 comprises a bag member 70 which is filled with a growing medium such as sand.

Sediment bag 70 is formed from a biodegradable material such as cotton fabric, burlap, a biodegradable polymeric sheet etc. The materials from which bag 70 is formed can be engineered to degrade in a predetermined period of time.

As can further be seen from FIG. 16 upper layers of bags 70 may further in corporate a plurality of seagrass seeds, plants, shoots or root cuttings. Upon placement of bag 70 the integral seeds, seagrass plants, shoots and root cuttings start growing. The ultimate goal is to repopulate the whole upper surface of the filled blow hole with seagrass 8.

When filled with a growing medium sediment bag 70 is usually about 18 to 24 inches long and has a generally circular cross section of from about 12 to about 18 inches. It is understood that sediment bag 70 can be of any convenient size.

In operation the process of this embodiment of this invention is effected by essentially filling the blow hole with bags 70 which contain a stabilizing medium such as sand or native sediment. A topmost layer of bags 70 is then added to the essentially filed blow hole wherein the top most layer incorporates seagrass seeds, plants, shoots or root cuttings 8. It is preferred that the uppermost layer of the filled blow hole be slightly higher than the adjacent seabed. The reason for this slightly higher elevation is that it has been found that seagrass in its growing process prefers to grow up, to a higher elevation as to grow down to a lower elevation. In addition to filling a blowout with sediment bags it is within the scope of this invention to fill the blowout with sediment tubes.

Figure 17:
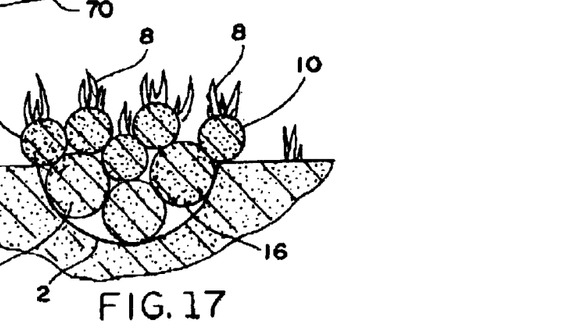
FIG. 17 is a end view a plurality of sediment perspective end view showing a propeller scar with a plurality of sediment tubes therein.

FIG. 17 shows still another embodiment of this invention where a large deep propeller scar 2 is stabilized and filled with a plurality of sediment tubes 10. Propeller scars do not come in standard sizes i.e. the size of a propeller scar from an outboard motor will vary with the size of the outboard motor. Further the size of a propeller scar from a tug boat will be larger than a propeller scar caused by a large outboard motor. As is stated above, sediment tubes in accordance with this invention can vary in diameter between 6 and 12 inches. Regardless it is understood by one skilled in the art that sediment tubes in accordance with this invention can be any convenient diameter or length. In accordance with this embodiment of this invention a plurality of sediment tubes can be used to fill a propeller scar. For example if the propeller scar was a large 24" scar from a tug boat it could be filled with four 6" diameter sediment tubes or two twelve inch tubes. Further it is understood that the number of layers of sediment tubes used to repair a given propeller scar can vary depending on the depth of the propeller scar which is being repaired.

As is discussed above sediment tubes for filling propeller scars and sediment bags for filling blow holes can incorporate, plants, plant cuttings and plant seeds. In accordance with this invention the growth of the plant cuttings and the germination of the plant seeds can be coordinated with the degradation of the sediment tube or bag. For example if a given sea grass seed germinates in 60 days, the material from which a given sediment tube or bag can be designed to start its degradation in 60 days. Once the degradation of the sediment tube or bag has started the sprout of a germinating seed or plant shoot can easily poke through the degrading material from which the sediment tube or sediment bag is formed.

Figure 18:
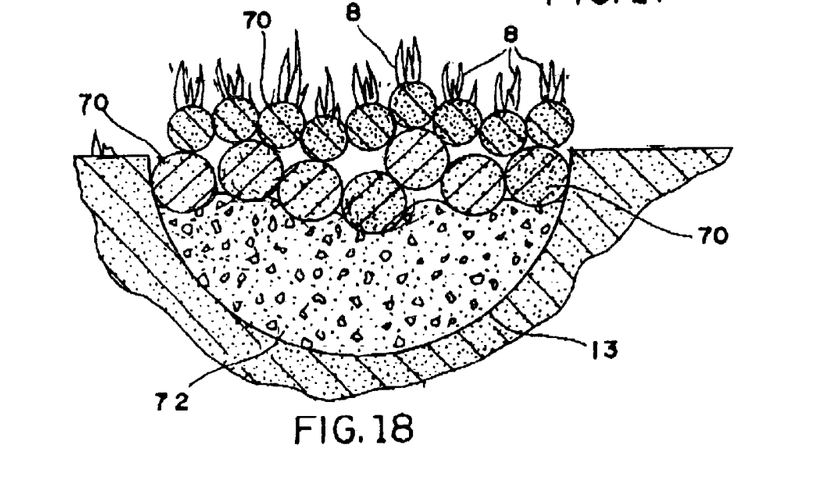
FIG. 18 is an end view showing the process of this invention wherein sediment bags are used with gravel.

FIG. 18 shows another embodiment of this invention wherein a blowout 3 is filled partially with a gravel or aggregate layer 72, over which is placed a plurality of sediment bags 70.

Further the degradation of a sediment tube or bag can be coordinated with the natural temperature cycle of body of water in which the planting is to occur. In most bodies of water there is a natural temperature rhythm and the growth and/or germination of seeds and the growth of plant shoots is timed to the natural temperature variations. That is seeds are dominant and plant shoots do not grow until a certain temperature cycle occurs.

In accordance with this invention the degradation and placement of the sediment tube or bag can be timed to this natural temperature cycle. If a given seed will not germinate or a plant shoot will not grow until the water temperature reaches a given temperature the degradation and placement of the sediment tubes or sediment bags in the growing area can be timed to this natural cycle.

The relationship of the natural temperature variations to when seeds germinate or plant shoots grow is easy to determine by simple observations. For example if it is known that a given species of seagrass seed will not germinate until the water temperature reaches 25° C. a sediment tube or bag can be selected or designed to degrade in 60 days and the placement of the sediment tube or bag in the water is effected 60 days prior to the date when the water temperature reaches 25° C. Hence the sediment tube or bag has had 60 days to stabilize and just as the plant shoots or seeds as are contained in the sediment tube or bag start to germinate or grow, the sediment tube or bag starts to degrade. As a result of this degradation the resulting new plant life can penetrate the sediment tube or bag thereby allowing the natural growth cycle to proceed.

The above discussion relates to the filling of sediment tubes and sediment bags with a growing medium. While the preferred growing medium is sand it is understood that the growing medium can encompass bundled seagrass, fine aggregate which is commonly sold under the term "fines", clay or other natural materials. Generally, it could be said that the sediment tubes and bags can be filed with any medium in which seagrass will root and grow.

Further, as is discussed above the growing medium can incorporate fertilizer. The term fertilizer in accordance with this invention includes growth enhancers, plant stimulants, root stimulants, hormones, growth regulators etc.

The above description and drawings are illustrative of modifications that can be made without departing from the present invention, the scope of which is to be limited only by the following claims.

What is claimed is:

1. A process for encouraging the growth of aquatic plants underwater in a propeller scar which comprises the steps of:
    a. forming a plurality of sediment tubes, the diameter of which is less than the width of said propeller scar, and filling said sediment tubes with a growing medium,
    b. stacking a plurality of said sediment tubes in said propeller scar wherein the stacked sediment tubes are adapted to impede the flow of water in the propeller scar and are adapted to disintegrate in a predetermined period of time.

2. The process of claim 1 wherein at least some of said sediment tubes contain a member selected from the group consisting of seagrass plants, sea grass plant shoots, and seagrass plant seeds.

3. The process of claim 2 wherein the growing medium further incorporates fertilizer.

4. The process of claim 2 wherein the degradation of the sediment tube is correlated to the growth pattern of aquatic life which is a member selected from the group consisting of seagrass plants, seagrass plant shoots or seagrass seeds as are contained in said sediment tube.

5. The process of claim 4 wherein the degradation of the sediment tube, at the time the aquatic life contained therein, starts to grow, is such that said aquatic life can grow through said sediment tube.

6. The process of claim 1 wherein the growing medium further incorporates fertilizer.

7. The process of claim 6 wherein the degradation of the sediment tube is correlated to the growth pattern of aquatic life which is a member selected from the group consisting of seagrass plants, seagrass plant shoots and seagrass seeds as is contained in said sediment tube.

8. The process of claim 7 wherein the degradation of the sediment tube, at the time the aquatic life contained therein, starts to grow, is such that said aquatic life can grow through said sediment tube.

9. The process of claim 1 wherein the placement of sediment tube in the propeller scar is such that the uppermost edge of the upper most layer of sediment tubes is slightly higher than the surrounding estuary bottom.

10. A process for restoring an underwater blowout as contained underwater on an estuary bottom which comprises filling said blowout with a plurality of sediment bags, wherein said sediment bags are formed from a biodegradable material and said sediment bags are filled with a growing medium.

11. The process of claim 10 wherein the uppermost layer of sediment bags contain a member selected from the group consisting of seagrass plants, sea grass plant shoots and seagrass plant seeds.

12. The process of claim 11 wherein the degradation of the sediment bag is correlated to the growth pattern of seagrass plants, seagrass plant shoots and seagrass seeds as are contained in said sediment bag.

13. The process of claim 12 wherein the degradation of the sediment bags, at the time the aquatic life contained therein starts to grow, is such that said aquatic life can grow through said sediment bag.

14. The process of claim 11 wherein the growing medium further incorporates fertilizer.

15. The process of claim 14 wherein the degradation of the sediment bag is correlated to the growth pattern of seagrass plants, seagrass plant shoots and seagrass seeds as are contained in said sediment bag.

16. The process of claim 15 wherein the degradation of the sediment bags, at the time the aquatic life contained therein starts to grow, is such that said aquatic life can grow through said sediment bag.

17. The process of claim 10 wherein the growing medium further incorporates fertilizer.

18. The process of claim 10 wherein the placement of sediment bags in the blowout is such that the uppermost edges of the uppermost layer of sediment bags is slightly higher than the surrounding estuary bottom.

19. The process of claim 10 wherein the blowout is partially filled with a member selected from the group consisting of aggregate or gravel and the sediment bags are placed on the top of said aggregate or gravel layer.

20. A process for encouraging the growth of aquatic plants underwater in a propeller scar which comprises the steps of:
    a. forming a sediment tube, which is formed from a biodegradable material and filling said sediment tube with a growing medium,
    b. positioning said sediment tube in a propeller scar, wherein said sediment tube is adapted to impede the flow of water in the propeller scar and is adapted to disintegrate in a predetermined period of time, wherein the upper most side of the sediment tube is higher than the surrounding estuary bottom.

* * * * *